United States Patent [19]
Harshbarger et al.

[11] Patent Number: 6,022,048
[45] Date of Patent: Feb. 8, 2000

[54] HYBRID ELECTRIC VEHICLE DRIVE MOTOR MOUNTING MODULE

[75] Inventors: M. Chad Harshbarger; Harl Donley; Nathan L. Schuler; Michael P. Lasecki, all of Fort Wayne, Ind.

[73] Assignee: Navistar International Transportation Corp, Chicago, Ill.

[21] Appl. No.: 09/109,431

[22] Filed: Jul. 2, 1998

[51] Int. Cl.[7] .................................................. B62D 21/02
[52] U.S. Cl. ........................ 280/781; 180/377; 180/65.4; 180/299; 180/300
[58] Field of Search .................................... 180/291, 299, 180/300, 65.2, 65.4, 312, 204; 280/781

[56] References Cited

U.S. PATENT DOCUMENTS

| | | | |
|---|---|---|---|
| 5,634,663 | 6/1997 | Krupp et al. | 280/800 |
| 5,741,026 | 4/1998 | Bonnville | 280/781 |
| 5,823,287 | 10/1999 | Chidamparam et al. | 180/377 |
| 5,855,394 | 1/1999 | Horton et al. | 280/781 |

*Primary Examiner*—Paul N. Dickson
*Assistant Examiner*—Tony Winner
*Attorney, Agent, or Firm*—Jeffrey P. Calfa; Dennis K. Sullivan

[57] ABSTRACT

A drive motor mounting module for a hybrid electric vehicle and the motor mounting module in combination with the hybrid electric vehicle. More specifically, the drive motor mounting module is comprised of a drive motor, a front motor mount support bracket, a chassis front support bracket, a chassis cross member, two rear motor mount brackets, two cross braces, two vertical channels and two motor module locating mounts. The entire module can be modularly assembled prior to installation to the vehicle chassis on a main assembly line. The mounting module engages the drive motor to the chassis by three point mountings.

14 Claims, 5 Drawing Sheets

6,022,048

HYBRID ELECTRIC VEHICLE DRIVE MOTOR MOUNTING MODULE

BACKGROUND OF THE INVENTION

The present invention relates to a drive motor mounting module for a hybrid electric vehicle, the motor mounting module in combination with the vehicle, and the method of installation into the vehicle. More specifically, the hybrid electric vehicle drive motor mounting module is comprised of a drive motor, a front motor mount support bracket, a chassis front support bracket, a chassis cross member, two rear motor mount brackets, two vertical channels, two cross braces, and two motor module locating mounts. The module can be modularly assembled prior to installation to the vehicle chassis on a main assembly line. The mounting module engages the drive motor to the chassis by three point mountings.

PRIOR ART

Series type hybrid electric vehicles are electric vehicles with an engine driven electric generator to supply electricity to the vehicle's battery and electric distribution system. Unlike parallel type hybrid electric vehicles which have a drive-line which may be driven directly from the conventional fuel burning engine as well as by an electric motor, there is no such engine to drive-line mechanical engagement in a series type hybrid electric vehicle. The term series refers to the path of energy from the engine to the drive-line and hence the power axle or axles and wheels. The generator feeds electricity to the electric system of the vehicle which includes the batteries and the drive motor. If the series type hybrid electric vehicle is not being driven, then all the electrical energy from the generator acts to charge the batteries. As a result, the drive motor needs not be mounted near or in line with either engine or generator. The drive motor may be mounted to the vehicle chassis as a completely separate step from the steps for engaging the engine and generator to the chassis. The series type hybrid vehicle lends itself to a modular motor installation. Hybrid electric vehicle technology is continuing to develop. Motor installation details and methods of assembly have not been previously described.

Since series type hybrid electric vehicles utilize an off the shelf electric motor with internal gearing, it is preferred that these off the shelf electric motors need not be significantly modified to allow installation to the chassis. The lack of mechanical engagement of the generator to the motor in the series type vehicles allows versatility in motor mounting. Three point mounting becomes a possibility.

Heretofore, a drive motor mounting module for a series type hybrid electric vehicle has not been suggested which is mounted to the vehicle through three point modular mounting without significant modification to the motor.

SUMMARY OF THE INVENTION

Accordingly, it is a primary object of the invention to provide a motor mounting module for a series type hybrid electric vehicle which allows for three point mounting to the chassis of the vehicle.

A second object of the invention is to provide a motor mounting module for a series type hybrid electric vehicle which requires no significant modification to an off-the-shelf electric motor for installation to the chassis of the vehicle. This will allow the use of various types and makes of electric motors as the vehicle's drive motor and hence lower the overall cost to produce series type hybrid electric vehicles.

The objects of the invention are satisfied with a hybrid electric vehicle drive motor mounting module comprised of an electric drive motor, a front motor mount support bracket, a chassis front support bracket, a chassis cross member, two rear motor mount brackets, two vertical channels, two cross braces, two motor module locating mounts, and two frame mount castings. The module can be modularly assembled prior to installation to the vehicle chassis on a main vehicle assembly line. The mounting module engages the drive motor to the chassis by a three point mounting arrangement.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
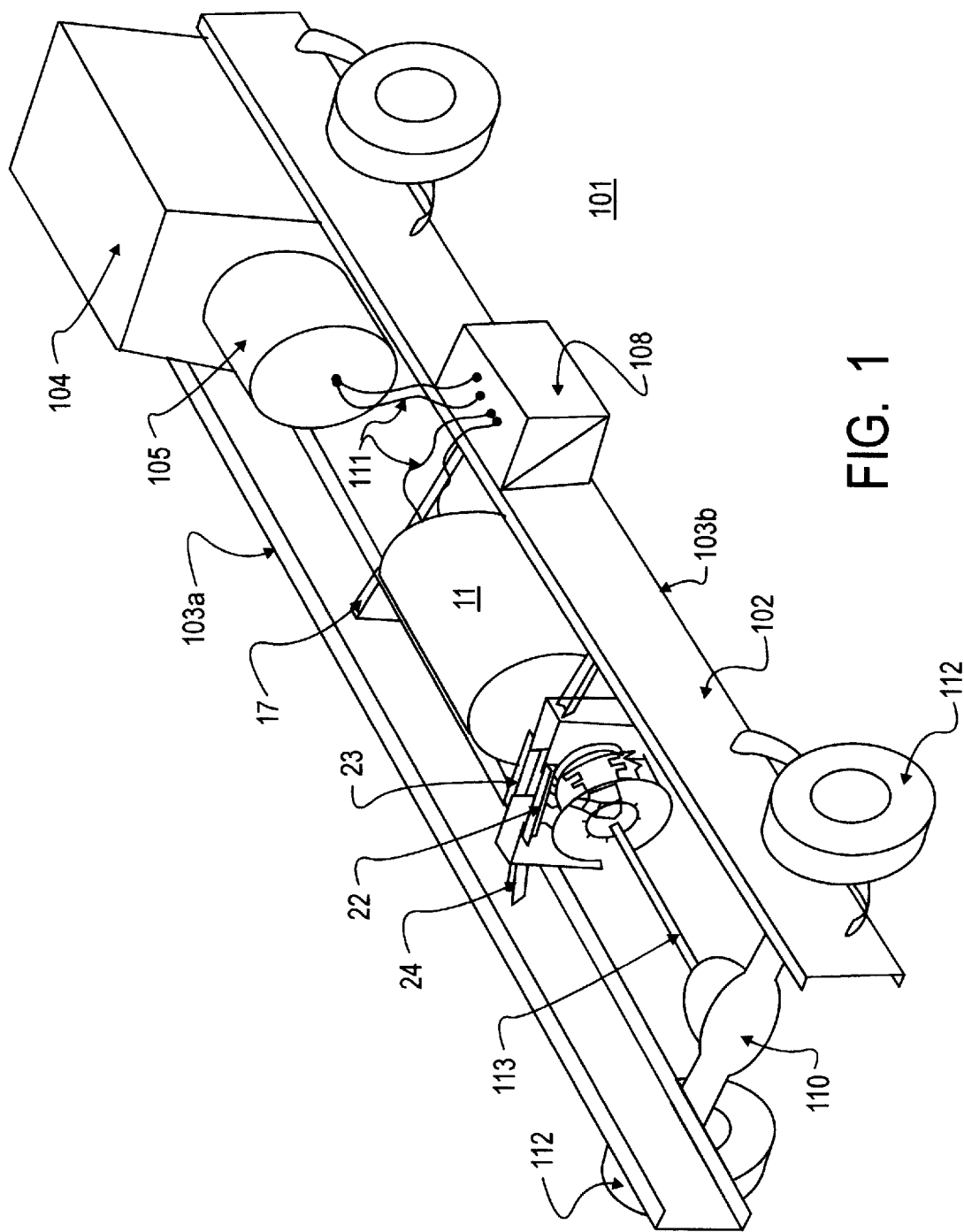
FIG. 1 is a rear perspective view of a chassis of a series type hybrid electric vehicle with a motor mounting module made in accordance with this invention.
Figure 2:
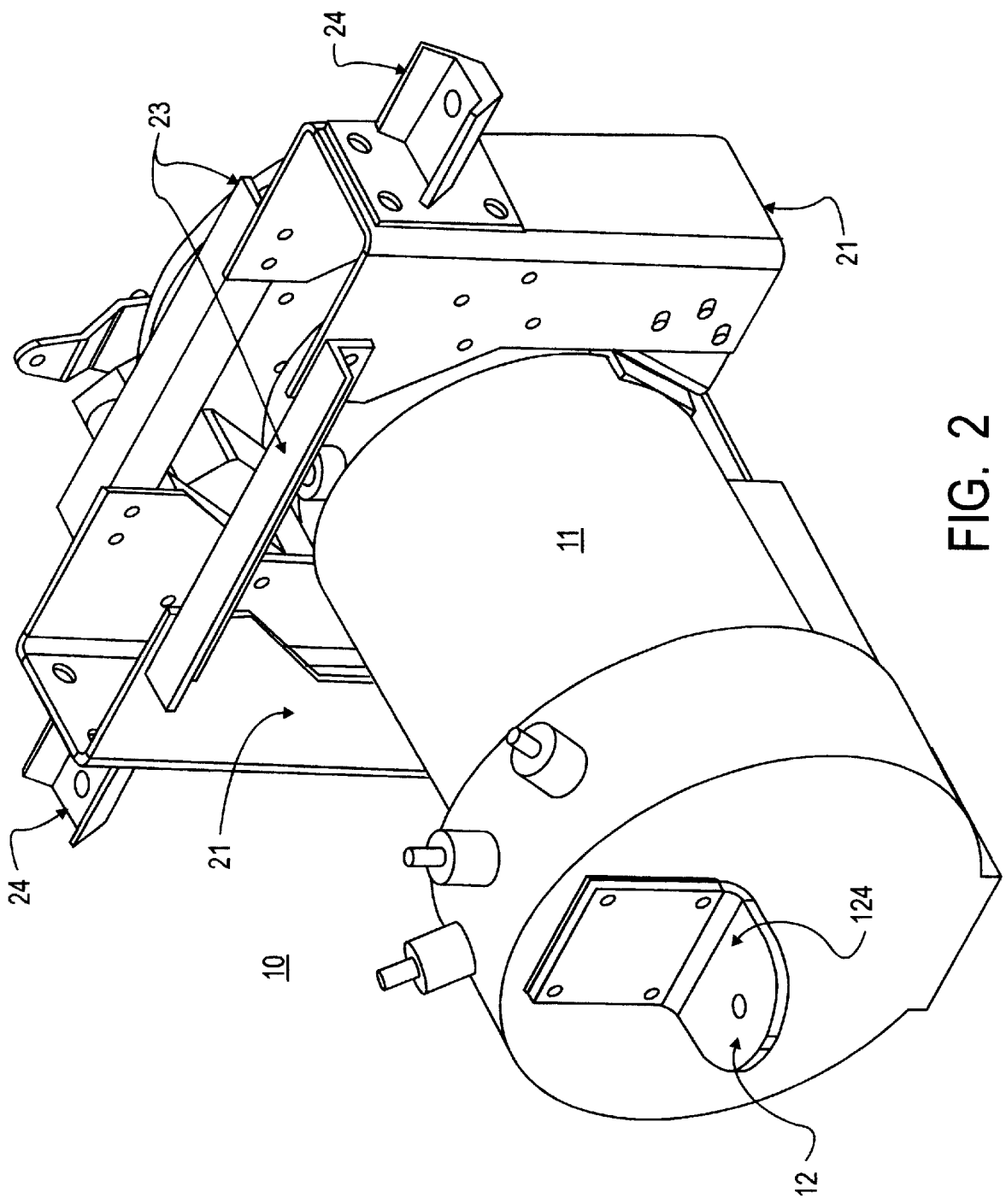
FIG. 2 is a left front perspective of the motor mounting module shown in FIG. 1 separate of the vehicle.
Figure 3:
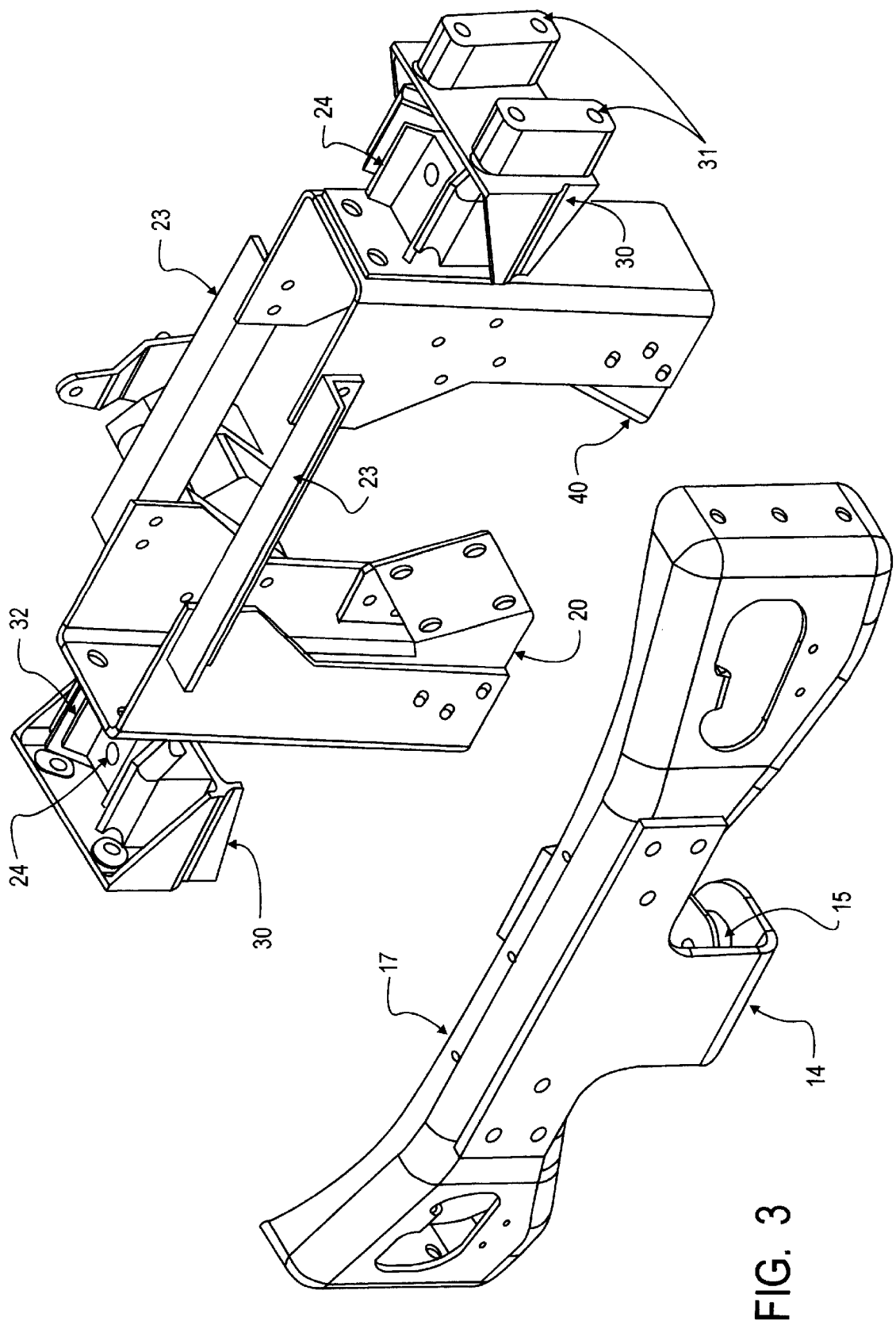
FIG. 3 is a left front perspective view of the support structure of the motor mounting module shown in FIG. 1 without a drive motor and separate of the vehicle.
Figure 4:
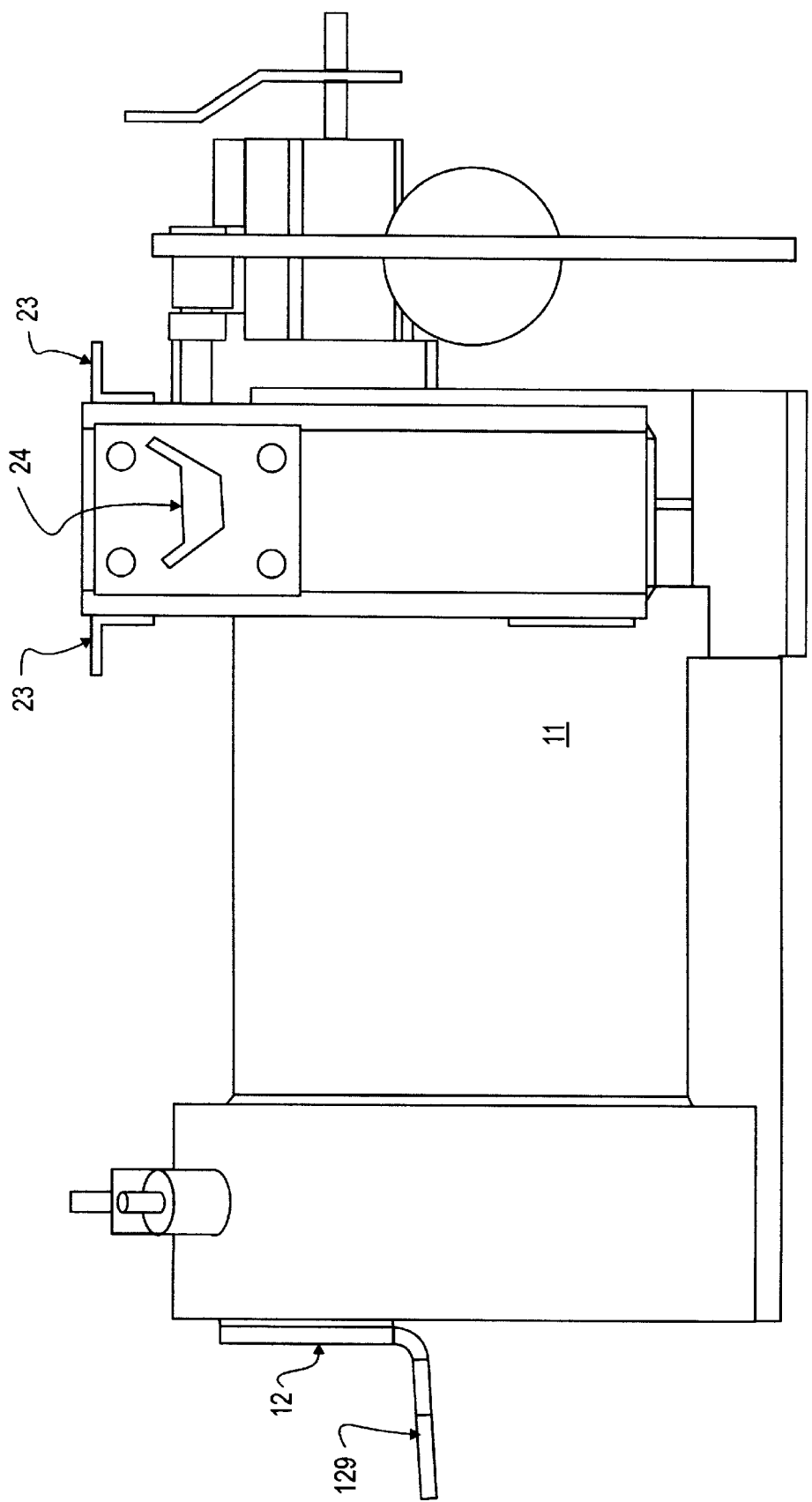
FIG. 4 is a partial left side view of the motor mounting module shown in FIG. 1.
Figure 5:
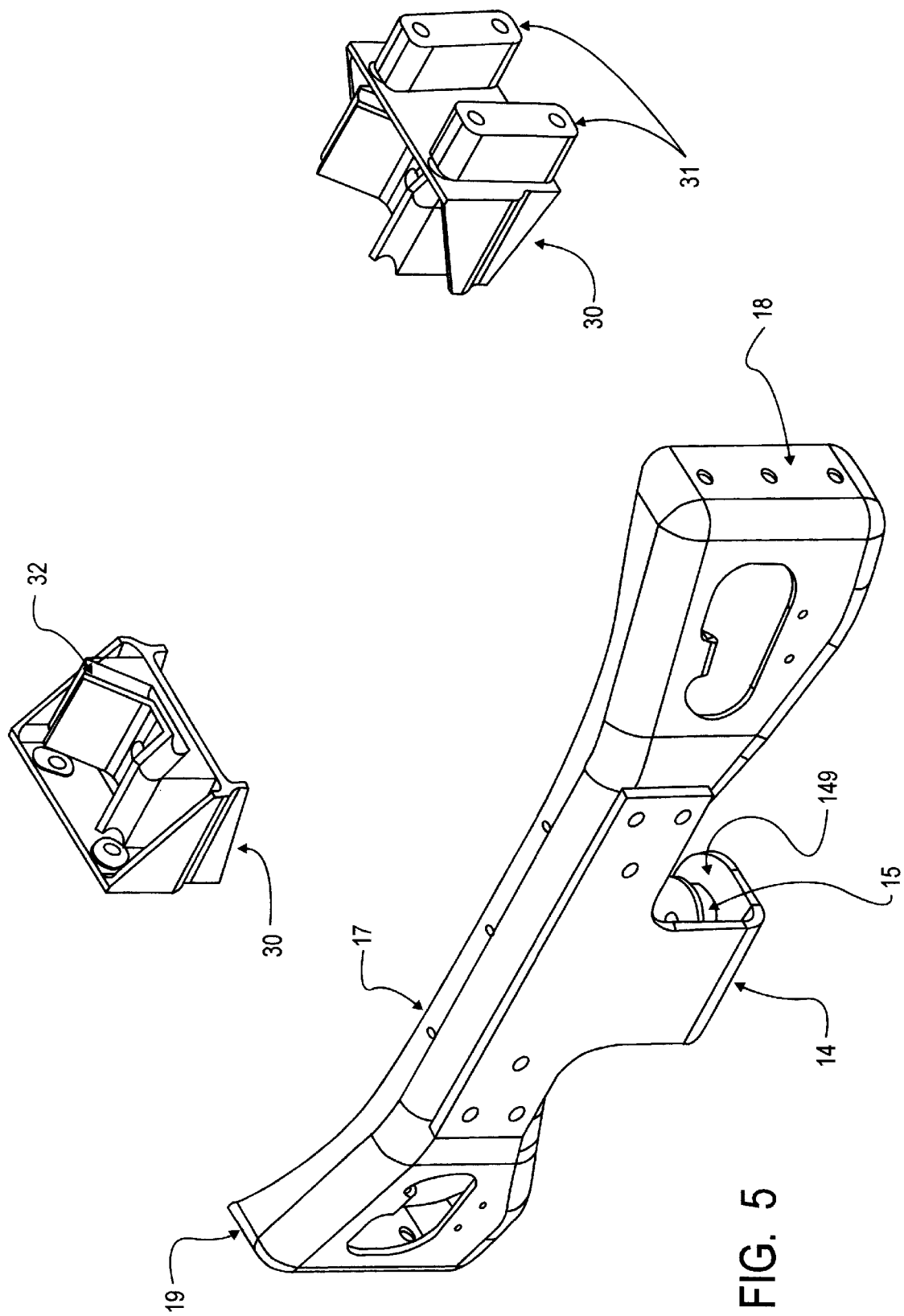
FIG. 5 is a partial left rear side view of the chassis mounting components separate of the motor mounting module and the vehicle shown in FIG. 1.

Referring now to the drawings in greater detail, in FIGS. 1 to 5, there is shown a series type hybrid electric vehicle 101 with a drive motor mounting module 10 made in accordance with this invention. The vehicle 101 has a chassis 102 with two frame rails 103a and 103b. There is an engine 104 and an electric generator 105 engaged to the frame rails 103a and 103b. The generator 105 is electrically engaged by cables 111 to an electric control system 106 (not shown) and batteries 107 (not shown). The batteries 107 are located within a battery box 108 which is engaged to a right frame rail 103b. The electric control system 106 and batteries 107 are electrically engaged by cables 111 to an electric drive motor 11. The electric motor 11 is engaged to the frame rails 103a and 103b through the drive motor mounting module 10.

The drive motor mounting module 10 is comprised and installed to the vehicle 101 as follows. A front motor mount support bracket 12 is engaged via fasteners 81 (not shown) to the front of the electric motor 11. A chassis cross member 17 is engaged to and between the frame rails 103a and 103b with connections at a left cross member side 18 and at a right cross member side 19. The chassis cross member 17 has a centered chassis front support bracket 14. The front motor mount support bracket 12 of the motor 11 is engaged to the chassis front support bracket 14 with a rubber isolator 15 inserted between at the area of engagement. The rubber isolator 15 prevents a metal to metal contact between the front motor support bracket 12 and the chassis front support bracket 14. In the preferred embodiment, the front motor support bracket 12 is right angle or "L" shaped with a horizontal chassis cross member engagement face 12a directed forward relative to the vehicle 101. Also in the preferred embodiment, the chassis front support bracket 14 is right angle or "L" shaped with a front motor horizontal engagement face 14a directed rearward relative to the vehicle 101. This preferred embodiment allows the chassis cross member 17 to be installed to the frame rails 103a and 103b on a main assembly line. Separate from the assembly line, the front motor support bracket 12 is engaged to the motor. The motor mounting module 10 is then dropped in and engaged to the chassis 102 on the main assembly line. The front motor support bracket 12 and the chassis front support bracket 14 comprise the first or front point of the unique "3 point" motor mounting of this invention.

The second and third three points or rear points of the "3 point" mounting are comprised as follows. A right rear motor mount bracket 20 is engaged to a right rear under side of the motor 11. A left rear motor mount bracket 40 is engaged to a left rear underside of the motor 11. Separate vertical channels 21 are engaged to the right rear motor mount bracket 20 and the left rear motor mount bracket 40. A cross brace 23 is engaged between the upper portions of the vertical channels 21 for lateral support. A motor module locating casting mount 24 is engaged to each vertical channel 21. On a main vehicle assembly line, a frame mount casting 30 is engaged to the inner faces of each of the frame rails 103a and 103b of the chassis 102.

The frame mount casting 30 contains a rear isolator 32. The rear isolator 32 on each of the frame mount castings 30 is made of a rubber and acts similar to the rubber isolator 15 that was previously described on the chassis front support bracket 14. The rubber isolator 15 and the rear isolator 32 provide electro-magnetic frequency (EMF) and radio frequency interference (RFI) isolation of the motor from the rest of the chassis 102 and vehicle 101. The rear isolators 32 are shaped to engage with the motor module locating casting mount 24 which was previously attached to the vertical channels 21. The frame mounted castings 30 are engaged to the frame rail 103a and 103b through spacers 31 and fasteners 85 (not shown). The frame mount castings 30, like the chassis cross member 17, are installed to the chassis 102 on a main vehicle assembly line, while the rest of the motor mount module 10 is assembled separate from the main vehicle assembly line. The motor module locating castings 24 are shaped to fit within the frame mounting castings 30, to allow the entire rear section of the motor mount module 10 to be dropped in and installed as a modular element on the main assembly line. In the preferred embodiment, the motor module locating casting mounts 24 on the vertical channels 21 are "V" shaped so they will be aligned within the also "V" shaped frame mount castings 30 when the entire rear section of the motor mount module 10 is dropped into the chassis 102. In the embodiment of the invention shown in FIG. 2, the vertical channels 21 are each comprised of a front section 21a, a back section 21c, and a side section 21b. When viewed from above, the vertical channels 21 are "U" shaped. Also in the embodiment shown in FIG. 3, the rear motor mount brackets 20 and 40 are also made up front faces 20a and 40a, inner side faces 20b and 40b, and back faces 20c and 40c. The motor module locating casting mounts 24 are engaged to the side sections 21b of the vertical channels 21. It is the inner side sections 20b and 40b of the rear motor mount brackets 20 and 40 that are engaged to the motor 11. The inner side sections 20a and 40a are shaped to conform to the underside of the motor 11. The front sections 20a and 40a and rear sections 20c and 40c of the motor mount brackets 20 and 40 fit within the "U" shape of the vertical channels 21 where they are engaged. This embodiment may have two cross braces 23 to provide further lateral support.

The motor mount module 10 of this invention allows modular installation of the motor 11 for the motor mount module 10 on the main assembly line as follows. Separate from the main assembly line, an off-line portion of the motor mount module 10 is assembled. The front motor mount support bracket 12 is engaged to the front of the motor 11. The side sections 20b and 40b, and two rear motor mount brackets 20 and 40 are installed to the rear under side of the motor 11. The vertical channels 21 are installed to the rear motor mount brackets 20 and 40. In the preferred embodiment, the motor mount brackets 20 and 40 slip into the "U" shape of the vertical channels 21 for engagement via fasteners 86 (not shown). The cross braces 23 are installed across the upper portions between the vertical channels 21. The motor module locating casting mounts 24 are installed to the outer sides of the vertical channels 21. An on-line portion of the motor mount module 10 is assembled along the main assembly line as follows. The chassis cross member 17 is installed between frame rails 103a and 103b. The frame mount castings 30 are installed on each frame rail 103a and the 103b rearward from the chassis cross member 17. The motor 11, with the front motor support bracket 12, the rear motor mount brackets 20 and 40, vertical channels 21, cross braces 23, and motor mount locating mounts 24 installed, is lowered into place to engage to the chassis front support bracket 14 of the chassis cross member 17 and the frame mount castings 30 already installed on the frame rails 103a and 103b of the chassis 102. Fasteners 87 (not shown) are used to finally engage the motor mount module 10 to the chassis 102 of the vehicle 101. The motor mount module 10 may be installed with any off-the-shelf electric motor 11. This allows for economical decisions related to the choice of electric motor 11 for the hybrid electric vehicle 101.

The electric motor 11 is mechanically engaged to a drive or rear axle assembly 110 with rear wheels 112 through a prop shaft or drive line 113. Although described and shown as rear drive, the invention may also be applied in a front drive configuration where the drive axle assembly 110 is forward on the vehicle 101. When the motor 11 is energized and rotates, the drive line 113 rotates which imparts rotational energy to the rear wheels 112 through the rear axle assembly 110.

As described above, the drive motor mounting module of the present invention, the hybrid electric vehicle 101 with the drive motor mounting module 10 installed, and the method of installation provide a number of advantages, some of which have been described above and others of which are inherent in the invention. Also modifications may be proposed to the drive motor mounting module 10, the hybrid electric vehicle 101, and the method of installation without departing from the teachings herein. Accordingly, the scope of the invention is only to be limited as necessitated by the accompanying claims.

We claim:

1. A three point drive motor mounting module for a hybrid electric vehicle with a chassis with two frame rails which includes an engine, and an electric generator engaged to the chassis, an electric control system and batteries electrically engaged to the generator, and a drive line engaged to a drive axle assembly and wheels, comprising:

(a) an electric drive motor;
   (b) said motor electrically engaged to the electric control system and batteries;
   (c) said motor mechanically engaged to the drive line of the vehicle;
   (d) a chassis cross member installed between the frame rails;
   (e) said chassis cross member having a chassis front support bracket;

(f) a frame mount casting engaged rearward of said chassis cross member to each of the frame rails;

(g) each of said frame mount castings having a rear isolator;

(h) said chassis front support bracket having a rubber isolator;

(i) a front motor support bracket engaged to a front section of said motor;

(j) said front motor support bracket shaped to engage to said chassis front support bracket of said chassis cross member to sandwich said rubber isolator, and to allow said motor to be lowered and engaged to the chassis;

(k) a right rear motor mount bracket engaged to a right rear underside of said motor;

(l) a left rear motor mount bracket engaged to a left rear underside of said motor;

(m) a vertical channel engaged to each of said right and left rear motor mount brackets;

(n) a cross brace engaged between an upper portion of each of said vertical channels;

(o) a motor module locating casting mount engaged to each of said vertical channels; and (p) said motor module locating casting mounts shaped to fit within said rear motor mount brackets to allow said motor to be lowered and engaged to the chassis.

2. The motor mount module of claim 1, wherein:

(a) said front motor support bracket is right angle shaped with a horizontal chassis cross member engagement face directed forward relative to the vehicle;

(b) said chassis front support bracket is right angle shaped with a front motor horizontal engagement face directed rearward relative to the vehicle; and (c) said horizontal chassis cross member engagement face is engaged to said front motor horizontal engagement face with said rubber isolator sandwiched between to prevent metal to metal contact.

3. The motor mount module of claim 2, wherein:

(a) said vertical channels being comprised of a front section, a back section, and a side section;

(b) said rear motor mount brackets being comprised of a front face, a back face, and an inner side face;

(c) said front faces of said rear motor mount brackets being engaged to said front sections of said vertical channels;

(d) said rear faces of said rear motor mount brackets being engaged to said rear sections of said vertical channels;

(e) said inner side faces of said motor mount brackets being shaped to conform to said rear underside of said motors.

4. The motor mount module of claim 3 wherein:

(a) a second cross brace runs between said upper portion of said vertical channels.

5. The motor mount module of claim 3, wherein:

(a) said frame mount castings are "V" shaped where said frame mount castings engage said motor module locating casting mounts;

(b) said motor module locating casting mounts are "V" shaped to engage within said frame mount castings; and (c) said motor module locating casting mounts are engaged to said frame mount castings with said rear isolators sandwiched between to prevent metal to metal contact.

6. A hybrid electric vehicle, comprising:

(a) a chassis with two frame rails;

(b) an engine and electric generator engaged to said chassis;

(c) an electric control system and batteries electrically engaged to said generator;

(d) said electric control system and batteries mechanically engaged to said chassis;

(e) a drive line engaged to a drive axle assembly and wheels;

(f) said drive axle assembly mechanically engaged to said chassis;

(g) an electric drive motor electrically engaged to said electric control system and batteries;

(h) said motor mechanically engaged to said drive line of said vehicle;

(i) a chassis cross member installed between the frame rails;

(j) said chassis cross member having a chassis front support bracket;

(k) a frame mount casting engaged rearward of said chassis cross member to each of said frame rails;

(l) each of said frame mount castings having a rear isolator;

(m) said chassis front support bracket having a rubber isolator;

(n) a front motor support bracket engaged to a front section of said motor;

(o) said front motor support bracket shaped to engage to said chassis front support bracket of said chassis cross member to sandwich said rubber isolator, and to allow said motor to be lowered and engaged to the chassis;

(p) a right rear motor mount bracket engaged to a right rear underside of said motor;

(q) a left rear motor mount bracket engaged to a left rear underside of said motor;

(r) a vertical channel engaged to each of said right and left rear motor mount brackets;

(s) a cross brace engaged between an upper portion of each of said vertical channels;

(t) a motor module locating casting mount engaged to each of said vertical channels; and (u) said motor module locating casting mounts shaped to fit within said rear motor mount brackets to allow said motor to be lowered and engaged to said chassis.

7. The hybrid electric vehicle of claim 6, wherein:

(a) said front motor support bracket is right angle shaped with a horizontal chassis cross member engagement face directed forward relative to the vehicle;

(b) said chassis front support bracket is right angle shaped with a front motor horizontal engagement face directed rearward relative to the vehicle; and (c) said horizontal chassis cross member engagement face is engaged to said front motor horizontal engagement face with said rubber isolator sandwiched between to prevent metal to metal contact.

8. The hybrid electric vehicle of claim 7, wherein:

(a) said vertical channels being comprised of a front section, a back section, and a side section;

(b) said rear motor mount brackets being comprised of a front face, a back face, and an inner side face;

(c) said front faces of said rear motor mount brackets being engaged to said front sections of said vertical channels;

(d) said rear faces of said rear motor mount brackets being engaged to said rear sections of said vertical channels;

(e) said inner side faces of said motor mount brackets being shaped to conform to said rear underside of said motors.

9. The hybrid electric vehicle of claim 8, wherein:

(a) a second cross brace runs between said upper portion of said vertical channels.

10. The hybrid electric vehicle of claim 8, wherein:

(a) said frame mount castings are "V" shaped where said frame mount castings engage said motor module locating casting mounts;

(b) said motor module locating casting mounts are "V" shaped to engage within said frame mount castings; and (c) said motor module locating casting mounts are engaged to said frame mount castings with said rear isolators sandwiched between to prevent metal to metal contact.

11. A process for installing an electric drive motor to a vehicle with a chassis with two frame rails which includes an engine, and an electric generator engaged to the chassis, an electric control system and batteries electrically engaged to the generator, and a drive line engaged to a drive axle assembly and wheels, comprising the steps of:

(a) assembling an off-line portion of a motor mount module off of a main assembly line, comprising the steps of:
  (i) engaging a motor mount support bracket to a front of an electric drive motor;
  (ii) installing a right rear motor mount bracket to a right rear underside of said motor;
  (iii) installing a left rear motor mount bracket to a left rear underside of said motor;
  (iv) engaging a separate vertical channel to said right rear motor mount bracket and to said left rear motor mount bracket;
  (v) engaging a cross brace between upper portions of said vertical channels; and
  (vi) engaging a motor module locating casting mount to each said vertical channel;

(b) assembling an on-line portion of a motor mount module on a main assembly line, comprising the steps of:
  (i) engaging a frame mount casting to an inner face of each of the frame rails, each said frame mount casting having a rear isolator,
  (ii) engaging a chassis cross member to and between the frame rails, said chassis cross member having a chassis front support bracket and said chassis front support bracket having a rubber isolator;
  (iii) lowering said off-line portion of said motor mount module to said chassis with said front motor support bracket contacting said chassis front support bracket and said motor module locating casting mounts contacting said frame mount castings; and
  (iv) engaging said motor mount support bracket to chassis front support bracket and said motor module locating casting mounts to said frame mount castings;

(c) electrically engaging said motor to the electric control system and batteries; and (d) mechanically engaging said motor to the drive line of the vehicle.

12. The process of claim 11, wherein:

(a) said front motor support bracket is right angle shaped with a horizontal chassis cross member engagement face directed forward relative to the vehicle;

(b) said chassis front support bracket is right angle shaped with a front motor horizontal engagement face directed rearward relative to the vehicle; and (c) said horizontal chassis cross member engagement face is engaged to said front motor horizontal engagement face with said rubber isolator sandwiched between to prevent metal to metal contact.

13. The process of claim 12, wherein:

(a) said vertical channels being comprised of a front section, a back section, and a side section;

(b) said rear motor mount brackets being comprised of a front face, a back face, and an inner side face;

(c) said front faces of said rear motor mount brackets being engaged to said front sections of said vertical channels;

(d) said rear faces of said rear motor mount brackets being engaged to said rear sections of said vertical channels;

(e) said inner side faces of said motor mount brackets being shaped to conform to said rear underside of said motors.

14. The process of claim 13, wherein:

(a) said frame mount castings are "V" shaped where said frame mount castings engage said motor module locating casting mounts;

(b) said motor module locating casting mounts are "V" shaped to engage within said frame mount castings; and (c) said motor module locating casting mounts are engaged to said frame mount castings with said rear isolators sandwiched between to prevent metal to metal contact.

* * * * *